United States Patent Office 3,304,735
Patented Feb. 21, 1967

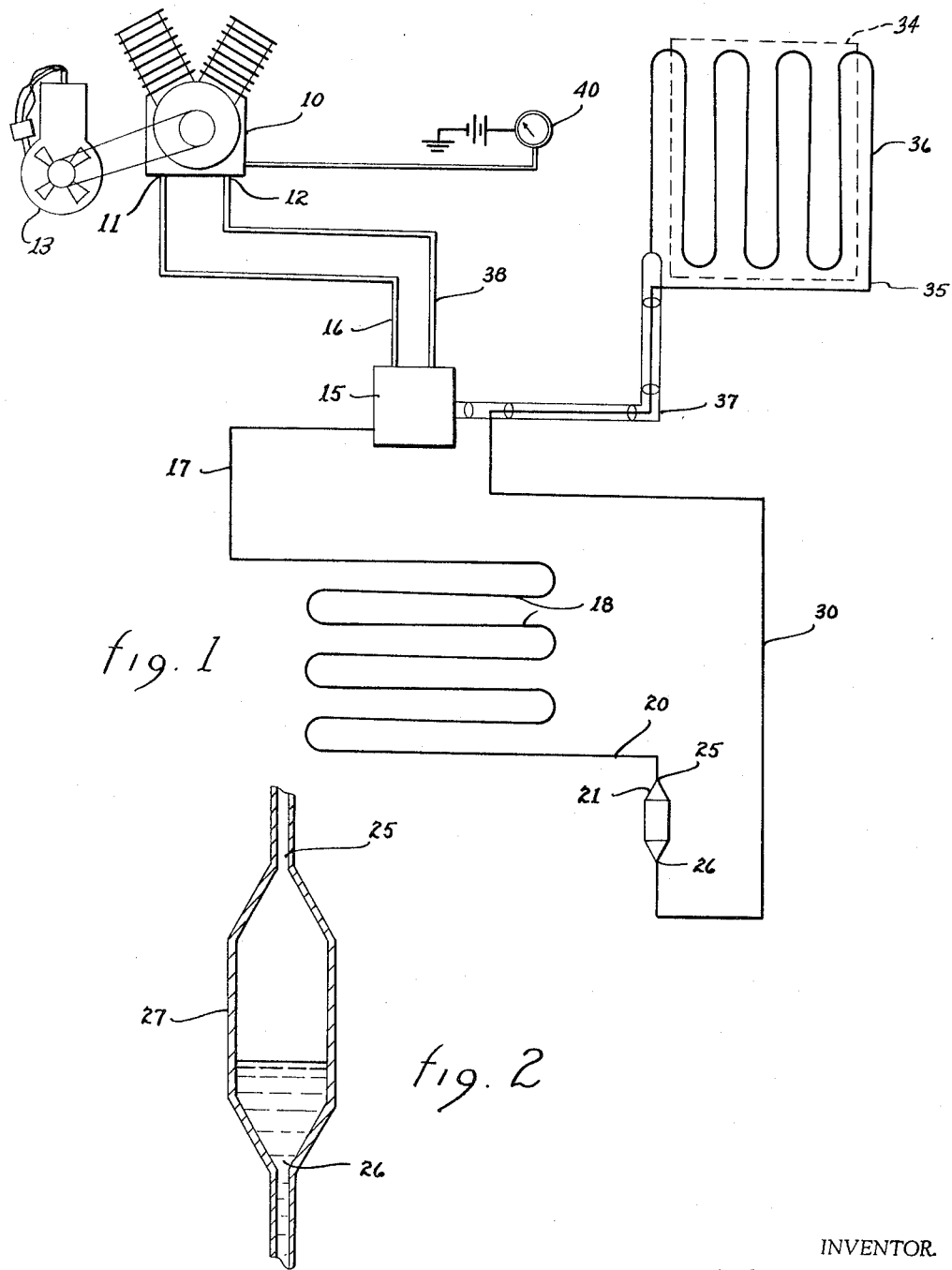

3,304,735
AUTOMOTIVE HEAT PUMP
Marvin H. Alexander, 3301 E. Mescal St.,
Phoenix, Ariz. 85028
Filed Jan. 13, 1965, Ser. No. 425,292
1 Claim. (Cl. 62—160)

The present invention pertains to heat pumps, and more specifically, to the type of heat pump systems utilizing a compressor driven by an automotive engine.

Automotive refrigeration has become an increasingly available luxury on modern automobiles. Automobiles having such refrigeration systems almost always include automotive heaters to provide warm air in cool weather and to supplement the temperature control in the automobile provided by the refrigeration system. The modern automotive refrigeration system must operate under conditions that are sometimes inimical to efficient cooling. For example, the compressor operates over a wide range of rotational velocity and therefore presents a rather "erratic" high pressure source of refrigerant for the system condenser. When the compressor is operated at low speed, such as when the automobile engine is idling, for extended periods of time, it is likely that the system evaporator will become starved and the system will fail to refrigerate air passing over the evaporator. Other variations, such as increase in the condenser temperature or decrease in evaporator temperature, also tend to reduce the rate at which air inside the automobile is cooled. The variations imposed on the automotive refrigeration system thus result in substantial variations in performance and thus variations in the ability of the system to cool the passenger compartment of the automobile.

Purchasers of automobiles who pay for the additional luxury of a refrigeration system, must also pay for the heating equipment that comes with the car. The heating equipment is a completely separate system from the refrigeration unit and requires separate installation, separate maintenance, and separate manipulative operation.

It is therefore an object of the present invention to provide an automotive heat pump system that may be used to heat or refrigerate the passenger compartment of an automobile.

It is also an object of the present invention to provide an automotive refrigeration system that more effectively cools the passenger compartment of the automobile through the expediency of increased efficiency.

It is still another object of the present invention to provide an automotive refrigeration system having a condenser and an evaporator interconnected by a capillary tube and a receiver sump that reduces the tendency of the evaporator to become "starved" when the engine driving the compressor is idled for extended periods of time.

Further objects and advantages of the present invention will become apparent to those skilled in the art as the description thereof proceeds.

Briefly, in accordance with one embodiment of the present invention, an automotive heat pump system is provided having a conventional compressor, condenser and evaporator. The compressor is connected to a reversing valve that reverses the connection of the condenser and evaporator to the inlet and outlet of the compressor to thereby permit the system to heat or refrigerate air passing over the evaporator. The condenser and evaporator of the system of the present invention include a receiver sump connected to the outlet of the condenser to collect and accumulate liquid refrigerant. A capillary tube is connected to the receiver sump in such a manner to insure that the capillary tube is always immersed in liquid refrigerant if any liquid refrigerant is present in the sump. The liquid refrigerant is transmitted through the capillary tube to the evaporator where it is expanded into the gaseous phase to provide the concomitant cooling of the evaporator coils. The gaseous refrigerant is then returned through the reversing valve to the compressor. A thermostat is also provided and is connected to a suitable electrical supply to operate a clutch to disengage the compressor from the driving automobile engine and to thus regulate temperature in accordance with the thermostat setting.

The present invention may more completely be described by reference to the accompanying drawings in which:

FIGURE 1 is a schematic drawing of an automotive heat pump system constructed in accordance with the teachings of the present invention.

FIGURE 2 is an enlarged view of the receiver sump of the sytsem of FIGURE 1.

Referring to FIGURE 1, a compressor 10 of the type normally found in automotive refrigeration systems is mounted adjacent a convenient power take-off position of the automotive engine 13. The embodiment chosen for illustration utilizes a conventional V-belt drive to supply power to the compressor. The compressor 10 includes an outlet 11 and an inlet 12. The outlet and inlet are chosen for purposes of discussion of the system of FIGURE 1 as a refrigeration system, it being understood that the inlet and outlet may be interchanged as described hereinafter to provide an automotive heating system. The compressor outlet 11 is connected to a reversing valve 15 which connects the outlet 11 through an outlet supply line 16 to a condenser supply line 17. The reversing valve shown in FIGURE 1 is shown in block form since the structure thereof is conventional and several types and designs of valves are available on the market. The condenser supply line 17 is connected to condenser coils 18 which receive the high pressure refrigerant from the line 17 and provide a heat exchange media for condensing the high-pressure pressure gas into its liquid phase. The outlet 20 of the condenser coils 18 is connected to a receiver sump 21. The receiver sump 21 may more readily be described by reference to FIGURE 2.

The receiver sump includes an inlet 25 and an outlet 26 interconnected by an enlarged body portion 27. Liquid refrigerant flowing from the inlet 25 will usually flow down the walls of the body portion 27 and accumulate adjacent the outlet 26. The outlet 26 is positioned beneath the inlet 25 and in a position within the receiver sump so that the outlet 26 is always immersed in liquid refrigerant if any liquid refrigerant is present in the sump. Prior art connections to expansion valves have sometimes included devices known as receiver dryers which are utilized as surge tanks to prevent liquid from backing up into the condenser. The receiver dryers of the prior art represent a manifestation of the lack of appreciation for maintaining the outlet 26 in an immersed position at all times. The outlet 26, when maintained immersed in liquid refrigerant, will always provide refrigerant in the appropriate liquid phase to the evaporator of the system to thereby prevent the evaporator from "starving" and thus reducing the efficiency of the system. If the compressor operates at low r.p.m. for extended periods of time, the amount of liquid refrigerant trapped in the receiver sump will decrease; however, the receiver sump acts as a storage chamber for liquid refrigerant to thereby prevent gas from passing from the condenser through the capillary tube to the evaporator.

Returning to FIGURE 1, the outlet 26 of the receiver sump is connected to a capillary tube 30. The capillary tube 30 is chosen of the appropriate length and inside diameter to provide a pressure drop thereacross to permit a phase change of the refrigerant from liquid to gaseous. The capillary tube is connected to the inlet 35 of the evaporated coils 36, shown mounted within a schematic representation of a passenger compartment 34, through a heat exchange tube 37. The heat exchange tube 37 permits the still-cool gaseous refrigerant from the evaporator to absorb heat from the still-warm liquid refrigerant in the capillary. The heat exchange between the tube 37 and the capillary 30 increases the efficiency of the system by removing heat from the liquid refrigerant prior to its evaporation in the evaporator. The evaporator coils are connected to the tube 37 and ultimately to the compressor inlet line 38 through the reversing valve 15.

The system of the present invention may also utilize a thermostat 40 positioned in the passenger compartment to enable the desired temperature to be selected. The thermostat is of the conventional type utilizing a bi-metal temperature sensing element and using electrical contacts to energize a bypass valve and/or a compressor clutch to regulate the flow of refrigerant to the condenser and ultimately to the evaporator.

The operation of the system of the present invention will now be described in connection with FIGURE 1. It will be assumed that the reversing valve 15 of FIGURE 1 has been adjusted to provide refrigeration rather than heating. The thermostat 40 is set in accordance with the desired temperature, which would close any bypass valve provided in the system and would energize the clutch to thereby drive the compressor through the V-belt drive from the automotive engine. Refrigerant would then be taken from the compressor inlet 12 and then compressed and delivered to the compressor outlet 11. In most systems, pressures at the outlet and inlet are 200 p.s.i. and 20 p.s.i. respectively. The high pressure refrigerant, which, because of the work performed upon the gas, is now at a very high temperature, is supplied to the condenser coils 18. The condenser coils receive the high temperature, high pressure refrigerant and provide a heat transfer means for transferring the heat to air being passed over the condenser coils. In most automotive refrigeration systems, the condenser coils are mounted in front of the radiator to permit air at the outside ambient temperature to pass over the condenser. The subsequent cooling of the high pressure refrigerant results in a phase change from a high pressure gas to a liquid which, because of the imperfect heat transfer in the condenser, is still at a relatively high temperature. The liquid refrigerant passes into the reciver sump 21 and immerses the receiver sump outlet 26 in liquid refrigerant. Liquid refrigerant is then supplied through the capillary tube through the heat exchange tube 37 to reduce the temperature of the liquid refrigerant prior to its delivery to the inlet 35 of the evaporator coils 36. The expansion of the refrigerant from the liquid to the gaseous phase is accompanied by a substantial reduction in temperature of the gas in accordance with well-known principles. The low temperature gas absorbs heat through the evaporator coils 36 and thereby cools air passing over the evaporator coils. In automotive refrigeration systems, air is forced over evaporator coils through the expediency of conventional electric fans of the centrifugal blower type to thereby deliver cool air to desired locations in the passenger compartment. The low pressure, low temperature gaseous refrigerant then passes through the tube 37 where it absorbs heat from the incoming liquid refrigerant contained within the capillary 30. The refrigerant continues through the compressor inlet 12 to be compressed and begin the cycle again.

The receiver sump 21 accumulates liquid refrigerant over the sump outlet 26 to thereby insure that liquid refrigerant is always available to the capillary tube 30. When the automotive engine is idling, and the compressor is thus producing very little high pressure, high temperature refrigerant at the outlet 11, the liquid refrigerant available for expansion in the evaporator coils 36 is thus normally reduced. When the engine is idling for extended periods of time, the liquid refrigerant is depleted and gas is then admitted to the capillary tubes thus starving the evaporator coils 36. The system then becomes inoperative and no cooling effect is produced. The system of the present invention provides a receiver sump to capture and accumulate liquid refrigerant to insure an adequate supply of this liquid refrigerant to the evaporator coils even though the compressor is forced to rotate at a drastically reduced rotational velocity through the idling of the automotive engine. The result of the utilization of the system of the present invention is more uniform refrigeration with drastically-reduced "starving" of the evaporator coils. When the compressor returns to its normal output through higher rotational velocity imparted by the automotive engine, the receiver sump will accumulate liquid refrigerant in order that the liquid refrigerant will be provided to the evaporator the next time that the compressor output is reduced by engine idling. The combination of the utilization of the receiver sump and the capillary tube permit the mounting and maintenance of a high performane system such as that described in connection with FIGURE 1, having another unexpected advantage in the form of ease with which the system may be charged. The system of the present invention may more readily be charged uniformly with a refrigerant, such as Freon, and thus insure proper operation of the system after recharging.

The present invention has been described in terms of a specific embodiment; it will therefore become apparent to those skilled in the art that many modifications may be made in the system of the present invention without departing from the spirit and scope thereof.

I claim:

In an automobile having an engine and a passenger compartment, an automotive heat pump system comprising:
 (a) a compressor, driven by the engine of said automobile, and having an inlet and an outlet for receiving low pressure refrigerant and discharging high pressure refrigerant,
 (b) a thermostat positioned in the passenger compartment of said automobile for controlling the amount of refrigerant from said compressor by connecting or disconnecting said compressor to or from the engine of said automobile,
 (c) a condenser connected to said compressor outlet for cooling high pressure refrigerant delivered from said compressor and for changing the phase of said refrigerant from gaseous to liquid,
 (d) a receiver sump having an outlet connected to said condenser for receiving refrigerant from said condenser, said receiver sump including an outlet positioned beneath said inlet arranged to be immersed in liquid refrigerant at all times that liquid refrigerant is present in said receiver sump,
 (e) a capillary tube connected to the outlet of said receiver sump,
 (f) an evaporator connected to said capillary tube,
 (g) means connecting said evaporator to said compressor inlet, and
 (h) a reversing valve for reversing the connections to the inlet and outlet of said compressor.

References Cited by the Examiner

UNITED STATES PATENTS

| | | | |
|---|---|---|---|
| 1,806,019 | 5/1931 | Muffly | 62—511 X |
| 2,614,396 | 9/1952 | Ratermann | 62—243 X |
| 2,669,098 | 2/1954 | Buell | 62—243 X |
| 2,750,762 | 6/1956 | Coyne | 62—324 |
| 2,806,358 | 8/1957 | Jacobs | 62—160 X |

MEYER PERLIN, *Primary Examiner.*